United States Patent [19]

Scardera et al.

[11] Patent Number: 4,744,917

[45] Date of Patent: May 17, 1988

[54] TOXIC CHEMICAL AGENT DECONTAMINATION EMULSIONS, THEIR PREPARATION AND APPLICATION

[75] Inventors: Michael Scardera, Hamden; Jimmie Floyd, Monroe; Frank S. Natoli, Hamden, all of Conn.

[73] Assignee: Olin Corporation, Cheshire, Conn.

[21] Appl. No.: 760,848

[22] Filed: Jul. 31, 1985

[51] Int. Cl.$^4$ .................. C01B 11/06; C11D 7/54; B08B 7/00

[52] U.S. Cl. .................. 252/187.28; 252/95; 252/104; 252/170; 252/174.21; 252/186.37; 252/309; 252/353; 134/42

[58] Field of Search .................. 252/186.36, 186.37, 252/187.23, 187.24, 187.25, 187.26, 187.27, 187.28, 94, 95, 104, 559, 174.21, 309, 353; 134/2, 42

[56] References Cited

U.S. PATENT DOCUMENTS

| | | | |
|---|---|---|---|
| 2,351,924 | 6/1944 | Carnauh | 252/187.28 |
| 2,719,828 | 10/1955 | MacMahon | 252/187.29 |
| 3,222,286 | 12/1965 | Barnes | 252/559 |
| 3,666,679 | 5/1972 | Crotty et al. | 252/187.26 X |
| 3,715,314 | 2/1973 | Morgenstern | 252/187.26 X |
| 4,337,163 | 6/1982 | Schilp | 252/187.24 X |
| 4,388,204 | 6/1983 | Dimond et al. | 252/98 |
| 4,472,291 | 9/1984 | Rosano | 252/186.28 |
| 4,588,514 | 5/1986 | Jones et al. | 252/98 |
| 4,595,520 | 6/1986 | Heile et al. | 252/187.26 X |

*Primary Examiner*—Teddy S. Gron
*Assistant Examiner*—Virginia B. Caress
*Attorney, Agent, or Firm*—James B. Haglind

[57] ABSTRACT

A calcium hypochlorite-containing emulsion having an emulsifying agent which comprises an oil soluble ethylene oxide adduct of an alkylphenol having from about 4 to about 7 moles of ethylene oxide and an oil soluble alkyl aryl sulfonate in a chlorinated organic solvent.

This emulsion is suitable for decontaminating areas, structures and articles which have been contaminated with toxic chemical agents. The emulsion can be prepared from calcium hypochlorite compounds made from a wide variety of processes and can be used over a broad range of climatic conditions. The emulsions are consistently formed very rapidly and can spread, penetrate and remain stable for sufficient amounts of time to provide complete neutralization of the contaminating agent.

13 Claims, No Drawings

TOXIC CHEMICAL AGENT DECONTAMINATION EMULSIONS, THEIR PREPARATION AND APPLICATION

This invention is related to decontaminating agents and a method for the decontamination of areas, structures, and articles contaminated by a toxicant. More particularly, the invention is related to the production and use of stable emulsions containing calcium hypochlorite.

The decontamination of areas, structures and articles which have been contaminated with toxic chemical agents, such as mustard gas, lewisite, yperite and other nerve chemical warfare agents, requires a decontaminating agent which can be applied rapidly, is highly stable and provides good adherence to the contaminated objects.

Compositions containing calcium hypochlorite have long been used as decontaminating agents for toxicant contaminated surfaces. For example, U.S. Pat. No. 2,351,924, published June 10, 1944 by B. Carnauh, teaches the decontamination of surfaces contaminated with yperite by admixing calcium hypochlorite with chlorinated solvents, such as, orthodichlorobenzene, tetrachloroethane and trichloroethylene, or solvents such as vaseline, or lanolin. Water or accelerators such as ethyl alcohol or ethyl acetate may be added to the mixture and a paste produced. The paste is said to be particularly useful for surfaces which are porous or covered with fatty substances.

U.S. Pat. No. 2,719,828, published Oct. 4, 1955 J. D. MacMahon, describes decontaminating compositions containing calcium hypochlorite, quick lime hydrated lime and calcium carbonate in powdered form which are subsequently mixed with water to form a slurry.

More recently decontaminating compositions have been formed by admixing calcium hypochlorite with tetrachloroethane (perchloroethylene) and Marlowet 1HF (a mixture of an n-alkylbenzene sulfonate, and a water soluble alkyl polyglycol ether in a solvent which is sold by Chemische Werke Huels AG). This mixture, while forming a stable emulsion, has been found to be sensitive to temperature conditions as well as the concentration of inert substances, such as, sodium chloride, which may be present in the calcium hypochlorite. In addition, the viscosities of the emulsions produced are limited.

There is need, however, for a decontaminating composition which rapidly forms a highly stable emulsion at a flow rate suitable for providing good adherence to contaminated surfaces and objects for extended periods of time which is independent of the source of calcium hypochlorite. In addition, there is a need for a process for producing decontaminating agents in emulsions from having a wide range of viscosities.

It is an object of the present invention to provide a decontaminating composition which rapidly forms an emulsion with water.

Another object of the present invention is to provide a decontaminating composition which remains stable when applied to contaminated surfaces and articles.

A further object of the present invention is to provide a method of producing a decontaminating agent which is consistently reproducible.

An additional object of the present invention is to provide a decontaminating composition which can be formed from calcium hypochlorite compounds produced by various manufacturing processes and containing varying amounts of inert ingredients.

A still further object of the present invention is to provide a method for producing a decontaminating agent over a wide range of temperatures.

Yet another object of the present invention is to provide a method for producing a decontaminating agent in emulsion form having a wide range of viscosities.

These and other objects of the invention are accomplished in a calcium hypochlorite-containing emulsion having an emulsifying agent which comprises an oil soluble ethylene oxide adduct of an alkylphenol having from about 4 to about 7 moles of ethylene oxide, and an oil soluble alkyl aryl sulfonate.

More in detail, the novel compositions of the present invention have as the decontaminating agent a calcium hypochlorite compound such as neutral calcium hypochlorite, dibasic calcium hypochlorite, hemibasic calcium hypochlorite and mixtures thereof. The concentration of $Ca(OCl)_2$ in the calcium hypochlorite compound is at least 40, preferably from about 55 to about 75 percent by weight.

The calcium hypochlorite compound also contains as an inert ingredient an alkali metal chloride, such as, sodium chloride, in varying amounts depending on the manufacturing process, for example, from about 3 to about 55 percent by weight. Other inert ingredients, such as, calcium chloride or calcium carbonate, are present in minor amounts. Calcium hydroxide is present in varying amounts as it is the basic compound in dibasic calcium hypochlorite and hemibasic calcium hypochlorite as well as being present in small amounts in neutral calcium hypochlorite.

While the calcium hypochlorite compound may be used as such, it may be desirable to add as a stabilizing agent an inorganic compound such as an alkaline earth metal oxide, for example, calcium oxide. Stabilizing agents are used in amounts which are sufficient to provide increased storage or shelf life of the calcium hypochlorite compound but which do not substantially reduce the dissolution time in water or the available chlorine content.

To consistently produce a highly stable emulsion which forms very rapidly and which can be applied quickly to contaminated articles and surfaces, an aqueous solution of the calcium hypochlorite compound is admixed with a novel emulsifying agent comprised of a blend of an oil soluble ethylene oxide adduct of an alkylphenol and an oil soluble alkyl aryl sulfonate.

The oil soluble ethylene oxide adduct has from about 4 to about 7 moles of ethylene oxide attached to the alkylphenol. Suitable alkylphenols are those having from about 8 to about 12 carbon atoms in the alkyl group and include, for example, octylphenol, nonylphenol, and dodecylphenol. Preferred as oil soluble adducts of the alkylphenols are those having about 6 moles of ethylene oxide, with the most preferred being the ethylene oxide adduct of nonylphenol having about 6 moles of ethylene oxide.

The oil soluble alkyl aryl sulfonate is, for example, a benzene sulfonate having the formula $RC_6H_4SO_3M$, where R is an alkyl group having from about 8 to about 18 carbon atoms and M is Ca or amine. Suitable alkyl groups are, for example, octyl, nonyl, decyl, dodecyl, and tridecyl. Preferred are benzene sulfonates where R is from about 9 to about 14 carbon atoms and M is Ca.

Also useful are naphthalene sulfonates having the formula $R_xC_{10}H_6SO_3M$, where R is an alkyl group having from 1 to about 4 carbon atoms, M is defined as above and x is from 1 to about 3. Examples of alkyl group substituents which can be employed include methyl, isopropyl and butyl.

The oil soluble ethylene oxide adduct of an alkylphenol and the oil soluble alkyl aryl sulfonate are blended together in amounts which when admixed with the aqueous solution of calcium hypochlorite, rapidly produce a highly stable emulsion which spreads and penetrates to cover and adhere to contaminated surfaces and articles. Suitable blends include weight ratios of the ethylene oxide adduct of alkylphenol to the oil soluble alkyl aryl sulfonate of from about 1:1 to about 5:1, preferably from about 1.5:1 to about 4:1, and more preferably from about 2:1 to about 3:1. The novel emulsifying agent is used as a solution in an organic solvent such as perchloroethylene or trichloroethylene. The solution of emulsifying agent is added to the calcium hypochlorite solution in emulsifying amounts which vary according to the viscosity of the emulsions desired. Suitable amounts include, for example, those in the range of from 0.1 to about 3 percent by weight of the calcium hypochlorite containing emulsion. For example, where the decontaminating agent in emulsion form is to be sprayed, suitable amounts of the emulsifying agent include, for example, from about 0.1 to about 1.5, and preferably from about 0.3 to about 1.0, and more preferably from about 0.4 to about 0.8 percent by weight. Emulsions having increased viscosities which are applied, for example, by spreading, painting or coating may contain amounts up to about 3 percent by weight.

Decontamination of contaminated articles and surfaces is accomplished using the novel process of the present invention comprising the admixing the emulsifying agent with an aqueous solution of the calcium hypochlorite compound in a vessel such as a tank or drum having circulation or agitation means. In one embodiment, the calcium hypochlorite compound is dissolved in water and the solution of emulsifying agent admixed with the calcium hypochlorite solution. A preferred embodiment of the process of the invention is accomplished by the addition of the solution of the emulsifying agent to water and then admixing the calcium hypochlorite compound. The decontaminating emulsion forms very rapidly and is then sprayed onto or applied to the contaminated articles and surfaces. Using emulsion forming times of from about 0.2 to about 10 minutes, and preferably of from about 0.5 to about 5 minutes, a highly stable calcium hypochlorite decontaminating emulsion is produced. These emulsions have suitable flow rates or viscosities when measured, for example, by the Deutsche Industrie-Normung (DIN) method no. 53211. DIN no. 53211 is a method for determining the flow times for substances having flow times up to 200 seconds. The method employs a DIN 4 cup which has a capacity of 100 cm$_3$±1 cm$^3$ and a jet of 4 mm (inside diameter) at the bottom of the cup. The liquid whose flow time is to be determined and the DIN 4 cup are at a temperature of 23° C.±0.5° C. The liquid is added to the cup in a manner which prevents the formation of air bubbles. Measurement of the flow time begins with the freeing of the lower opening of the jet and is stopped as soon as the stream of liquid below the jet breaks for the first time. The flow time for each specimen is determined twice.

When sprayed on or applied to articles and surfaces contaminated by toxic chemicals at concentration levels which would normally be present, using, for example, the decontamination equipment employed by the armed forces of the United States or penetrate and remain stable for sufficient periods of time to provide complete neutralization or decontamination. The emulsions can be consistently formed using calcium hypochlorite compounds prepared by a wide variety of processes and under a broad range of climatic conditions.

Further illustrations are provided by the following examples with no intention of being limited thereby. All percentages and parts are by weight unless otherwise indicated.

EXAMPLE 1

Calcium hypochlorite (50 g.) and water(500 g.) at 12° C. were added to a tank equipped with a circulating pump and mixed for 5 minutes to form a solution of calcium hypochlorite. To this solution was added 4.95 g. of a mixture of oil soluble calcium dodecylbenzene sulfonate (NINATE ® 401, a product of the Stepan Co.), and an oil soluble ethylene oxide adduct of nonylphenol (POLY-TERGENT ® B-200, a product of the Olin Corp.) in perchloroethylene (100 g.). The weight ratio of ethylene oxide adduct to calcium dodecylbenzene sulfonate was 2:1. Upon addition of the surfactant blend, the admixed solutions formed an emulsion in about 2 minutes which remained stable in the container for 24 hours. When the emulsion was applied to a vertical surface it then adhered to and covered the vertical surface for a period of about 1 hour. The flow rate of the emulsion, as determined by the Deutsche Industrie-Normung no. 53211 was 27 seconds.

EXAMPLE 2

The procedure of Example 1 was employed with the single exception that 6.6 grams of a mixture of the ethylene oxide adduct of nonylphenol and the calcium dodecyl sulfonate at a weight ratio of 1.5:1 were used. The emulsion formation time was 3.5 minutes and the flow rate was 29 seconds.

EXAMPLE 3

The procedure of Example 1 was employed using as the calcium hypochlorite compound a homogeneous mixture of 50 g. of anhydrous neutral calcium hypochlorite, containing 18 percent by weight of NaCl, and 7.5 g. of lime. The emulsion, whose formation time was 3.5 minutes, was then agitated at a high rate of speed and became very viscous. The emulsion could support a pencil placed vertically and had the consistency of "cold cream".

EXAMPLE 4

The procedure of Example 2 was followed exactly with the exception that the weight ratio of POLY-TERGENT ® B-200 to NINATE ® 401 was 3:1. The emulsion formed in 2.5 minutes with a flow rate of 30 seconds.

EXAMPLE 5

The procedure of Example 2 was repeated using an emulsifying agent having a weight ratio of POLY-TERGENT ® B-200 to NINATE ® 401 of 4:1. The emulsion formation time was 4 minutes and the flow rate 20 seconds.

EXAMPLE 6

The procedure of Example 1 was duplicated using dibasic calcium hypochlorite containing 11 percent by weight of NaCl as the calcium hypochlorite compound and 3.3 g. of the emulsifying agent. A stable emulsion formed after 2 minutes having a flow rate of 32 seconds.

EXAMPLE 7

To water (50 g.) at 13° C. in a blending apparatus was added 6.6 g. of an emulsifying agent having a weight ratio of POLY-TERGENT ® B-200 to NINATE ® of 1:1 in 10 g. of perchloroethylene. Super Tropical Bleach-3 (Battelle Memorial Institute) (50 g.) was added and the components blended. Upon dissolution of the Super Tropical Bleach-3, an emulsion formed within 30 seconds having a flow time of 28–30 seconds.

EXAMPLE 8

The procedure of Example 7 was employed using 500 g. of water and 100 g. of perchloroethylene containing 2.6 g. of the emulsifying agent having a 2:1 weight ratio of POLY-TERGENT ® B-200 to NINATE ® 401. Dibasic calcium hypochlorite containing 6 percent by weight of NaCl was added (50 g.) and the mixture blended. An emulsion having a flow time of 20 seconds formed three minutes after the addition of the calcium hypochlorite compound.

EXAMPLE 9

The procedure of Example 1 was repeated using 99 pounds of water cooled to a temperature of 6.7° C. (44° F.) and 33 pounds of perchloroethylene containing 0.75 percent by weight of the emulsifying agent at a 2:1 ratio of POLY-TERGENT ® B-200 to NINATE ® 401. Within 2.5 to 3 minutes, an emulsion formed having a flow time of 22 seconds.

What is claimed is:

1. A calcium hypochlorite-containing emulsion having an emulsifying agent which comprises an oil soluble ethylene oxide adduct of an alkylphenol having from about 4 to about 7 moles of ethylene oxide wherein the alkyl group has from about 8 to about 12 carbon atoms, and an oil soluble alkyl aryl sulfonate in a chlorinated organic solvent.

2. The calcium hypochlorite-containing emulsion of claim 1 in which the emulsifying agent is in solution in perchloroethylene or trichloroethylene.

3. The calcium hypochlorite-containing emulsion of claim 2 in which said calcium hypochlorite is selected from the group consisting of neutral calcium hypochlorite, dibasic calcium hypochlorite, hemibasic calcium hypochlorite, and mixtures thereof.

4. The calcium hypochlorite-containing emulsion of claim 2 in which the weight ratio of said oil soluble ethylene oxide adduct of an alkylphenol to said oil soluble alkyl aryl sulfonate is from about 1:1 to about 5:1.

5. The calcium hypochlorite-containing emulsion of claim 2 in which said alkyl aryl sulfonate is a benzene sulfonate having the formula $RC_6H_4SO_3M$, where R is an alkyl group having from about 8 to about 18 carbon atoms and M is Ca or amine.

6. The calcium hypochlorite-containing emulsion of claim 5 where R is an alkyl group having from about 9 to about 14 carbon atoms and M is Ca.

7. The calcium hypochlorite-containing emulsion of claim 6 in which said ethylene adduct has about 6 moles of ethylene oxide.

8. The calcium hypochlorite-containing emulsion of claim 7 in which said alkylphenol is nonylphenol.

9. A decontaminating agent for toxic chemicals comprised of an emulsion of an aqueous solution of a calcium hypochlorite compound and an emulsifying amount of a solution of a mixture of an oil soluble ethylene oxide adduct of an alkylphenol having from about 4 to about 7 moles of ethylene oxide and an oil soluble calcium alkyl aryl sulfonate in a chlorinated organic solvent.

10. A method of decontaminating articles and surfaces contaminated with toxic chemicals which comprises admixing an emulsifying amount of said emulsifying agent of claim 2 with an aqueous solution of calcium hypochlorite compound to form an emulsion; and applying said emulsion to articles and surfaces.

11. The method of decontaminating articles of claim 10 having an emulsion forming time of from about 0.2 to about 10 minutes.

12. The calcium hypochlorite-containing emulsion of claim 3 in which a solvent for the calcium hypochlorite compound is water.

13. The decontaminating agent of claim 9 in which the solution contains perchloroethylene or trichloroethylene as the solvent.

* * * * *